July 19, 1938.  G. R. PFLASTERER  2,123,963

RAILWAY SIGNALING APPARATUS

Filed May 12, 1936

INVENTOR
George R. Pflasterer.
BY
HIS ATTORNEY

Patented July 19, 1938

2,123,963

UNITED STATES PATENT OFFICE 2,123,963

RAILWAY SIGNALING APPARATUS

George R. Pflasterer, Swissvale, Pa., assignor to The Union Switch & Signal Company, Swissvale, Pa., a corporation of Pennsylvania Application May 12, 1936, Serial No. 79,300

17 Claims. (Cl. 246—41)

My invention relates to railway signaling track circuits, and has for an object the provision of novel and improved means for insuring the response of a track relay when a car or train enters the associated section.

I will describe two forms of track circuits embodying my invention, and will then point out the novel features thereof in claims.

Figure 1:
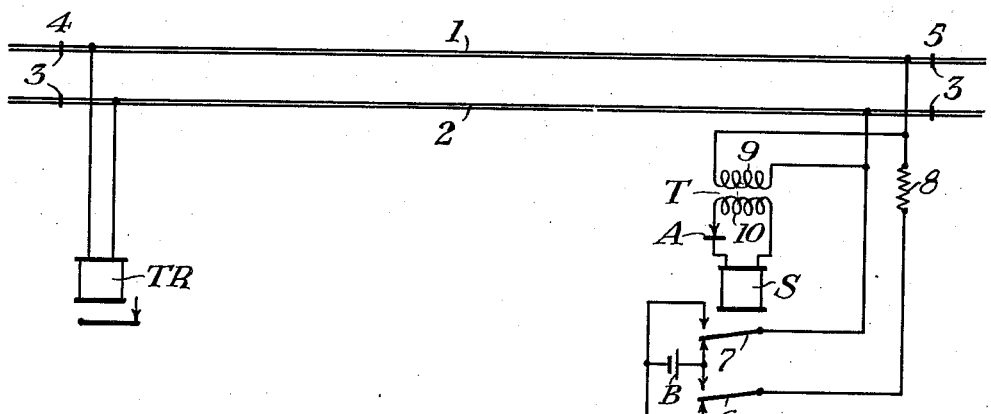
Figure 2:
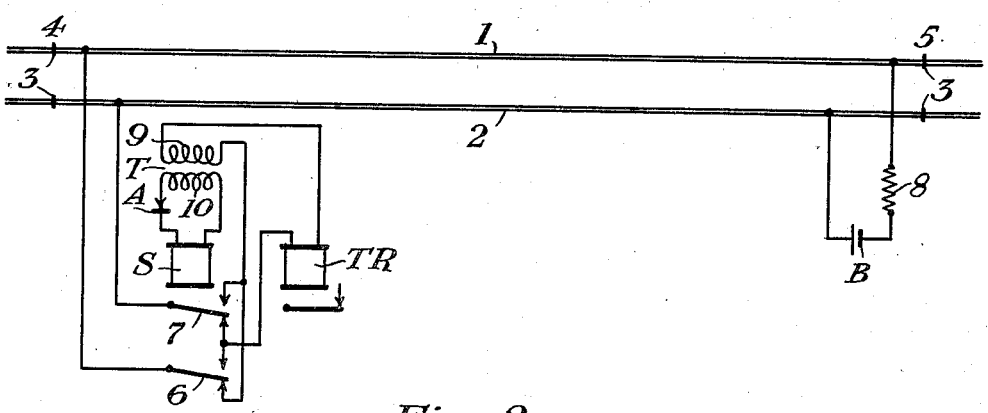

In the accompanying drawing, Fig. 1 is a diagrammatic view illustrating one form of track circuit embodying my invention, and Fig. 2 is a diagrammatic view illustrating another form of track circuit embodying my invention.

Similar reference characters designate similar parts in each of the several views.

Referring to Fig. 1, the reference characters 1 and 2 designate the track rails of a stretch of railway track, which rails are divided by insulated joints 3 to form a track section 4—5.

Located at one end of this section and connected across the rails is a track relay designated by the reference character TR. Located at the other end of this section is a source of track circuit current which, as here shown, is a battery B. The supply of current from this battery to the track rails is controlled by a relay S having two neutral contacts 6 and 7. This relay is normally deenergized so that its front contacts are open and its back contacts closed. Battery B is then connected across the rails of section 4—5 through a path which passes from one terminal of this battery, through back point of contact 6, current limiting resistance 8 to track rail 1, and from track rail 2 through the back point of contact 7 to the other terminal of battery B. It will be readily apparent that whenever the relay S is energized, so that the front points of its contacts 6 and 7 are closed, the polarity of the current supplied to the track circuit will be reversed.

For controlling the relay S, I provide the transformer T having a primary winding 9 connected across the rails in multiple with the battery B, and having a secondary winding 10 connected to the relay S through an asymmetric unit A.

I shall assume that with all apparatus in its normal condition, as shown in the drawing, the section 4—5 becomes occupied by a train. The shunting action of the wheels and axles of such train will cause a rapid decrease of the current flowing in primary winding 9 of transformer T so that an impulse of current will be induced in the secondary winding 10. The asymmetric unit A is so poled as to pass freely this impulse of current so that relay S becomes energized. When the back points of contacts 6 and 7 of relay S become opened, a still further reduction in the value of the current flowing in primary winding 9 will occur so that another impulse of current will be induced in secondary winding 10. This impulse will be flowing in the same direction as the first impulse so that the pickup of relay S will be aided by the second impulse. When the contacts 6 and 7 become engaged with their front points, a sudden increase in the value of the current flowing in primary winding 9 will occur, but this current will be flowing in the opposite direction so that the corresponding impulse induced in secondary winding 10 will be of such polarity as will tend to maintain relay S in its energized condition. When the energy supplied to relay S is dissipated, contacts 6 and 7 will naturally fall to their released positions. When the front points of contacts 6 and 7 become opened, a sudden decrease in the amount of current flowing in the primary winding 9 will occur so that an impulse of energy will be induced in the secondary winding 10. When the contacts 6 and 7 come into engagement with their back points, there will be a sudden increase of current in the primary winding 9 which will induce another impulse of current in the secondary winding 10. Both latter impulses, however, will be of such polarity as will be prevented, by asymmetric unit A, from flowing into the relay S.

From the foregoing description of the operation of relay S, it will be apparent that when the section 4—5 becomes occupied, the relay S will become momentarily energized to reverse the direction of current flow through the track circuit and track relay TR. Consequently, when the section 4—5 becomes occupied by a train, not only will the current flowing in track relay TR be reduced by the shunting action of the wheels and axles of such train, but also, the direction of such current will be momentarily reversed so that the release of the track relay will be aided.

When the train vacates the section 4—5, the current flowing in primary winding 9, due to the absence of the shunting action of the wheels and axles, will become suddenly increased so that an impulse of current will be induced in secondary winding 10. This impulse, however, will be of such polarity as will be prevented, by asymmetric unit A, from flowing in the relay S. The relay S, therefore, receives a series of three impulses of energy when the section becomes occupied but does not receive subsequent impulses, induced in secondary winding 10 thereafter, until such time as the section 4—5 again becomes occupied.

Referring now to Fig. 2, I have shown herein the same general arrangement similar to that shown in Fig. 1 except that the relay S and transformer T are located at the relay end of the track circuit. The track battery B is connected across the rails through current limiting resistor 8 in the usual manner. Contacts 6 and 7 of relay S are connected in the form of a pole changer between the track rails and the track relay TR, and the primary winding 9 of transformer T is connected in series with the track relay TR between this relay and the pole changing contacts 6 and 7. When the section 4—5 becomes occupied by a train, the relay S will receive three impulses of energy all of the same polarity in a manner similar to that described for the arrangement shown in Fig. 1. The asymmetric unit A will prevent subsequent impulses of current, induced in secondary winding 10 when the relay S releases and when section 4—5 again becomes unoccupied from flowing through relay S, in a manner similar to that explained for the apparatus shown in Fig. 1. From the foregoing, it will be apparent that the release of the track relay TR will be aided, when the section 4—5 becomes occupied, by a momentary reversal of the direction of current flow in the relay TR.

Since current will be induced in the secondary winding 10 of transformer T only upon a sudden change in the current flowing in primary winding 9, the apparatus embodying my invention will not be responsive to gradual changes in current flowing in primary winding 9 such, for example, as may occur due to changes in ballast resistance.

Furthermore, during dry weather conditions when good shunting action is necessary to cause relay TR to release in response to a train entering the section, relay S will be more certain to operate because of the relatively large reduction in the amount of current flowing in transformer T as the train enters the section; whereas, during wet weather conditions, when the reduction in current in transformer T may not be so great, relay TR will be released by a relatively poor shunt. The combination of the two relays TR and S provides, therefore, for more reliable shunting under all possible conditions of track.

Although I have herein shown and described only two forms of apparatus embodying my invention, it is understood that various changes and modifications may be made therein within the scope of the appended claims without departing from the spirit and scope of my invention.

Having thus described my invention, what I claim is:

1. In combination, a section of railway track, a source of track circuit current, a normally deenergized relay, means effective to connect said source across the rails of said section in one direction or in the other direction according as the back contacts or the front contacts respectively of said relay are closed, means effective when said section becomes occupied by a train to energize said relay momentarily and only momentarily, and a track relay receiving current from the rails of said section.

2. In combination, a section of railway track, a source of track circuit current connected across the rails of said section, a track relay, a normally deenergized auxiliary relay, means effective to connect said track relay across the rails of said section in one direction or in the other direction according as the back contacts or the front contacts respectively of said relay are closed, and means effective when said section becomes occupied by a train to energize said auxiliary relay momentarily and only momentarily.

3. In combination, a section of railway track, a source of energy for supplying current to the rails of said section, a relay receiving operating current from the rails of said section, and means including a transformer also receiving energy from the rails of said section for momentarily and only momentarily causing a reversal in the direction of the operating current flowing through said relay when said section becomes occupied by a train.

4. In combination, a section of railway track, a source of energy for supplying current to the rails of said section, a relay receiving operating current from the rails of said section, and means receiving energy from said source of energy for momentarily and only momentarily causing a reversal in the direction of the operating current flowing through said relay when said section becomes occupied by a train.

5. In combination, a section of railway track, a source of energy for supplying current to the rails of said section, a relay receiving operating current from the rails of said section, and means including an auxiliary relay receiving energy from said source for momentarily and only momentarily causing a reversal in the direction of the operating current flowing through said first mentioned relay when said section becomes occupied by a train.

6. In combination, a section of railway track, a track circuit including the rails of said section and a track relay as well as a pole changer and a source of energy, said pole changer normally occupying one position but operable to a different position, and means effective when said section becomes occupied by a train to cause said pole changer to assume momentarily but only momentarily said different position.

7. In combination, a section of railway track, a track circuit including the rails of said section and a track relay as well as a pole changer and a source of energy, said pole changer normally occupying one position but operable to a different position, and means responsive to traffic conditions in said section for at times causing said pole changer to assume momentarily but only momentarily said different position.

8. In combination, a section of railway track, a source of track circuit current connected across the rails of said section, a track relay also connected across the rails of said section, a pole changer interposed between said rails and said track relay, and means for operating said pole changer when said section becomes occupied by a train.

9. In combination, a section of railway track, a track circuit for said section including a source of current and a track relay which is normally supplied with operating current flowing in one direction, and traffic controlled means for momentarily reversing the direction of the operating current flowing in said track relay when said section becomes occupied by a train and for thereafter restoring such current to its normal direction regardless of whether the section is occupied or unoccupied.

10. In combination, a section of railway track, a track circuit for said section including a source of energy for supplying operating current and a track relay, a pole changer for reversibly governing the operating current supplied to said track relay, and traffic controlled means responsive only to a rapid change in the operating current flowing in said track circuit for governing said pole changer.

11. In combination, a section of railway track provided with a track circuit including a track relay and a source of energy, an auxiliary relay having front contacts and back contacts, means governed by said track circuit effective to supply said auxiliary relay with an impulse of energy when said track circuit becomes occupied provided said back contacts are then closed, means effective to supply said auxiliary relay with another impulse of energy during the interval when both said back and said front contacts are opened, means effective to supply said auxiliary relay with still another impulse of energy when said front contacts become closed, and means governed by said auxiliary relay for governing the direction of current flowing through said track relay.

12. In combination, a section of railway track provided with a track circuit including a track relay and a source of energy for supplying operating current to said track relay, a transformer having a primary winding and a secondary winding, said primary winding connected to said track circuit in such manner that the current flowing in the primary winding decreases or increases according as said section becomes occupied or unoccupied respectively, an auxiliary relay for governing the polarity of the operating current supplied to said track relay, and means including an asymmetric unit for connecting said auxiliary relay to said secondary winding.

13. In combination, a section of railway track, a source of current for supplying energy to the rails of said section, a transformer the primary of which is connected across said rails, a relay connected to the secondary of said transformer, a pole changer governed by said relay for reversibly connecting said source of current to said rails, and a track relay also connected across the rails of said section.

14. In combination, a section of railway track, a track circuit for said section including a source of operating current and a track relay, a transformer the primary of which receives energy from said track circuit, an auxiliary relay connected to the secondary of said transformer, and a pole changer governed by said auxiliary relay for governing the direction of operating current flowing through said relay.

15. In combination, a section of railway track, a track circuit for said section including a source of current and a track relay receiving operating current from said source, a transformer the primary of which receives energy from said track circuit, an auxiliary relay connected to the secondary of said transformer by an asymmetric unit poled so as to permit the energization of said relay by current flowing in one direction only, and pole changing means governed by said auxiliary relay for governing the direction of operating current flowing through said track relay.

16. In combination, a section of relay track, a track relay connected across the rails of said section, a normally deenergized auxiliary relay having a pair of pole changing contacts, a source of energy reversibly connected to said rails by said contacts, a transformer having its primary winding connected across the rails, and means including the secondary winding of said transformer for supplying said auxiliary relay with an impulse of current upon a rapid decrease in the current in said primary winding occuring when said section becomes occupied by a train.

17. In combination, a section of railway track, a source of track circuit current connected across the rails of said section, a track relay, a normally deenergized auxiliary relay having a pair of pole changing contacts, means including said contacts for reversibly connecting said track relay to said rails, a transformer having its primary winding connected between said track relay and said pole changing contacts, and means including the secondary winding of said transformer for supplying said auxiliary relay with an impulse of current upon a rapid decrease in the current in said primary winding occurring when said section becomes occupied by a train.

GEORGE R. PFLASTERER.